Oct. 29, 1968  R. E. ARMSTRONG  3,408,067
SKIING SIMULATOR DEVICE
Filed May 19, 1966
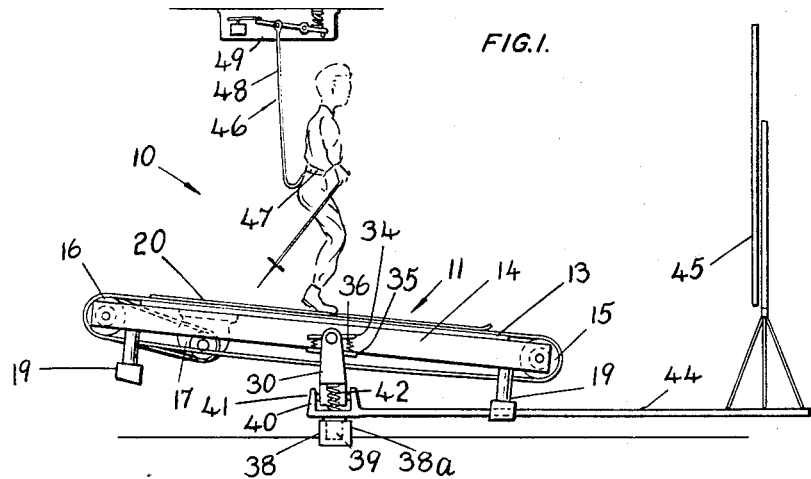
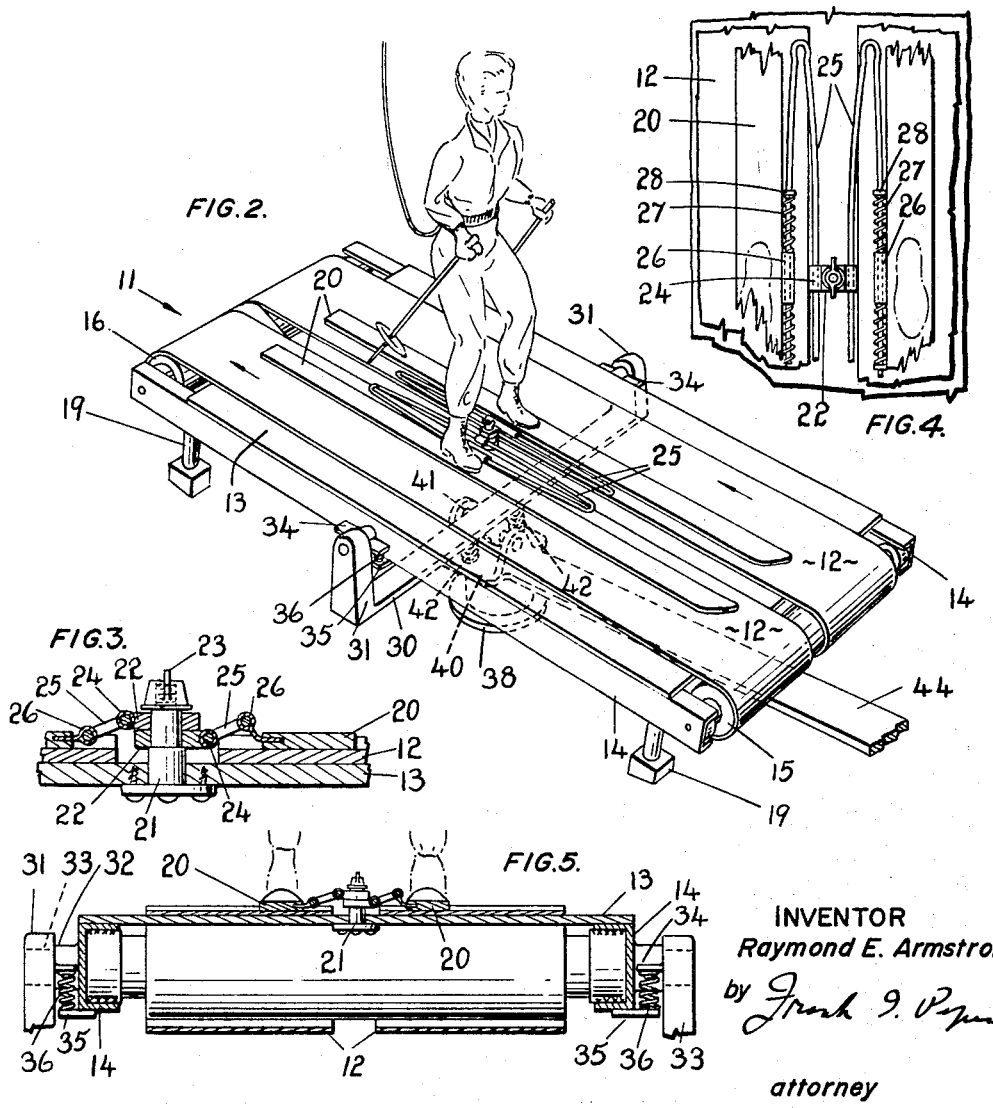
INVENTOR
Raymond E. Armstrong
by Frank J. Pipin
attorney United States Patent Office 3,408,067
Patented Oct. 29, 1968

3,408,067
SKIING SIMULATOR DEVICE
Raymond E. Armstrong, Toronto, Ontario, Canada
(62 Crosland Drive, Scarborough, Ontario, Canada)
Filed May 19, 1966, Ser. No. 551,450
10 Claims. (Cl. 272—16)

ABSTRACT OF THE DISCLOSURE

An apparatus which will simulate snow-skiing to a stationary user thereof. The apparatus has a platform on which a pair of endless belts are mounted and a post positioned between the two belts to which the skis may be fastened so that each ski is positioned over a separate belt. The illusion of forward movement is achieved when the belts rotatably move from the tips of the skis to the opposite end. The platform is secured to a gimbal frame thereby permitting the platform to be tilted from side to side by the user. A safety belt secured to the user prevents the user from falling and stops the rotational movement of the belts when the user loses his balance.

This invention is directed to a recreational and training device, and in particular to a skiing simulator device.

In learning to ski, or in teaching others to ski, it is common practice to proceed to the beginners slopes and to immediately commence with the basic steps of skiing. While in young people this is generally quite satisfactory and usualy offers no particular drawbacks, in older people there is often great reluctance to take the initial step of commencing to ski owing to self-consciousness and lack of self-confidence, due no doubt to a general dissimilarity of skiing action to normal modes of locomotion.

An object of the present invention is to provide a skiing simulator by means of which familiarity with certain aspects characteristic of skiing can be obtained without at the same time involving any danger of falling while in motion.

A further object of the present invention is to provide a safe and easily operated training and practice device by which certain essential features of skiing are simulated without the motion normally associated therewith.

What I have provided is a skiing simulator device for use by a skier to simulate skiing action while being substantially stationary, comprising: platform means to support a skier on skis; a pair of side-by-side endless belts providing individual ski-support surfaces on a platform means; belt driving means to rotate the endless belts; belt drive control means for selectively operating the belt driving means; and ski restraint means mounted on the platform intermediate the ends thereof and attachable to the skis to limit the movement thereof relative to the platform means, whereby rotation of the belts relative to the skis produces sliding of the skis over the upper belt surfaces.

In order to provide entertainment and an association of ideas of the sensation of skiing with the action of skiing, I have also provided cine-projector means actuated by the skiing device and located in front of the person using the simulator and showing a suitable film such as a skier in action moving down a slope. The present invention also provides a safety harness whereby in the event that a user of the simulator loses his balance, the safety belt prevents him from falling and at the same time stops the rotational movement of the supporting belts, also arresting the cine-projector so that the picture "freezes" until the skier upon the simulator resumes a suitable attitude.

The invention is described with reference to the accompanying drawings wherein:

FIG. 1 is a side view showing a skier mounted upon a simulator according to the present invention, and facing the cine-projector screen;

FIG. 2 is a general view of the arrangement shown in FIG. 1;

FIG. 3 is a sectional view of the ski-securing device illustrated in FIG. 2;

FIG. 4 is a scrap view looking downward of an alternative ski-securing device showing ski-centering means; and FIG. 5 is a transverse sectional view showing the ski-securing means together with details of the pivotal mounting arrangement of the platform means.

Referring to FIGS. 1 and 2, the simulator device 10 comprises platform means 11 having a pair of endless belts 12 mounted for rotation thereon, on which the skis 20 are mounted by attachment to a centre pivot post 21. The platform means 11 is mounted for fore and aft pivotal movement upon a support platform frame 30, which in turn is mounted for transverse canting motion and/or horizontal swinging motion upon a transverse gimbal frame 40 carried by simulator support pedestal 38. A cantilever beam member 44 adapted for swinging motion with the simulator platform means 11 carries a viewing screen 45 for portraying a skier in action.

Referring to particulars of FIGS. 1 and 2, the platform means 11 on which the endless belts 12 are mounted comprises a belt support surface 13 secured to side frame members 14 which support a front roller 15 and a back roller 16 over which the belts 12 pass. A suitable drive motor 17, such as an electric motor having a built-in reduction gear, is mounted on the under surface of the member 13, driving the back roller 16 directly by means of a suitable V-belt. Stop legs 19 restrict fore and aft platform motion.

The skis 20 are secured to the platform means 11 by means of a central pivot post 21 attached to the belt-support surface 13 of the platform. A first embodiment of the ski-attachment means is illustrated in FIGS. 2 and 3 and a second embodiment is illustrated in FIG. 4. Referring first to the first embodiment, this comprises a pair of collars 22 mounted on the post 21 in superimposed relation one with the other, and secured thereon by wing nut 23. Ski-mounting tubes 24 are formed at the outer ends of collars 22 and are adapted for use with tubular frames 25 which are mounted in sliding relation with ski-mounting tubes 26 attached to the individual skis.

The platform means 11 is supported by a platform support frame 30 extending transversely of the platform means 11, side pedestal members 31 having axles 32 mounted in journalled apertures 33 in the side members 31 and secured at their inner ends to the side frame members 14. Stabilizing of the platform in a fore and aft direction is provided in part by an upper stabilizing member 34 secured to the side pedestal members 31, a lower stabilizing member 35 secured to the frame side members 14, and compression springs 36 extending between the upper and lower stabilizing members 34 and 35 to provide a restoring force to the platform when it is moved from a horizontal position.

The simulator is mounted clear of the ground by a simulator support pedestal 38 having a vertical recess 38A therethrough receiving a support shaft 39 which carries a transverse gimbal frame 40 at the upper end thereof. It is contemplated that use of a cylinder support shaft 39 will permit swinging of the simulator about its vertical axis.

The transverse member 30 of the support frame is secured to the gimbal frame 40 by means of a fore and aft pivot pin 41. A pair of compression springs 42 on each side of the pivot pin 41 provides restoring force between the gimbal frame 40 and the support frame member 30, so that side-to-side canting of the platform can be carried out by a user.

A cantilever beam 44 secured to the gimbal frame 40 carries a viewing screen 45 on to which a projector (not shown) can project an action picture of a skier in motion.

A safety harness 46 includes a belt 47 for attachment about the person of a skier, having a leash member 48 secured thereto and depending from a support and cut-out device 49. In the event that the user loses his balance and falls, the leash member 48 becomes taut and prevents him from falling, while at the same time the leash-support member 49 includes an electrical cut-out device which de-activates the motor 17 so that the belts 12 come to a standstill.

By using an electric motor 17 having a built-in reduction gear, the inertia of the rotating masses can be correspondingly reduced, thereby reducing the size of motor required and at the same time reducing the total inertia of moving parts, so that the belts 12 come to a halt more quickly.

Referring to the ski attachment harness illustrated in FIG. 4 the tubular frames 25 are mounted in sliding relation with ski-mounting tubes 26 attached to the individual skis, and compression springs 27 extending over the frame members 25 and compressed between the mounting tube 26 and shoulder stops 28 provide longitudinal centering action for the skis relative to the fixed pivot post 21 to which the collars 22 are secured. The longitudinal relative position of the ski can be adjusted relative to the pivot post 21 by means of adjustable grub screws securing the shoulder stops 28 in sliding relation with the slide frame members 25.

It is contemplated that the control circuit for the cine-projector can be connected with the cut-out device 49, so that in the event of a fall by the user the picture ceases its motion.

It is contemplated that the control circuit for the drive motor 17 can be connected by means of limit switches to the platform means 11, so that the device is not operated until a user adopts an appropriate skiing position which produces forward tilting of the support frame 11, to simulate the effect of going down hill. It is further contemplated that the under-surface of the belts 12 contacting the support surface 13 may be of irregular form to produce characteristic "bumping" motion similar to that encountered in skiing.

In addition to the brace legs 19 shown attached to the frame, it is contemplated that a permanent platform may be provided to support the after end of the platform means 11, so that a completely stable walk-on to the device is provided.

In addition to providing a safe, substantially tumble-free recreation, training and practice device, it will be seen that many characteristic movements associated with skiing can be readily duplicated by a user of the device, while at the same time a visual encouragement and prompt is provided by means of a suitable film projected onto the viewing screen to be observed by the user for purposes of emulation and entertainment.

What I claim is:
1. A skiing simulator device for use by a skier to simulate skiing action while substantially stationary, comprising: platform means to support a skier on skis; a pair of side-by-side endless belts providing individual ski-support surfaces on said platform means; belt driving means to rotate said endless belts; belt drive control means for selectively operating said belt driving means; and ski restraint means mounted on said platform intermediate the ends thereof and attachable to said skis to limit the movement thereof relative to the platform means, whereby rotation of said belts relative to the skis produces sliding of the skis over the upper belt surfaces.

2. A device as claimed in claim 1 wherein said platform means is mounted for tilting in a fore and aft mode about a horizontal transverse axis extending normal to said belts and positioned relative to said ski-restraint means to permit tilting of the platform means by inclination of the user's body.

3. A device as claimed in claim 2, wherein said platform means is mounted upon a support pedestal for transverse canting motion.

4. A device as claimed in claim 2 wherein said belt drive control means includes means responsive to the tilting of the platform means to control operation of said belt driving means.

5. A device as claimed in claim 1 wherein said ski restraint means comprises a pivot post extending upwardly from said platform means, having a pair of collars mounted thereon one above the other and rotatable about the post, a pair of ski attachment means for attachment to the skis of the user, and pivotal link members connecting said ski attachment means to said collars to permit limited movement relative to the post, of skis secured to said restraint means.

6. A device as claimed in claim 5 wherein each said link member includes pivot pin attachment means at each end thereof.

7. A device as claimed in claim 5 including harness suspension means mounted above said platform means, harness means for attachment to the body of a user including a suspension leash for connection to the harness suspension means, said harness suspension means including tension responsive actuator cut-out means to de-energize said belt driving means on actuation of the cut-out, said suspension leash being of a length to remain slack when a user is in skiing posture and to become taut to support the skier in the event of a fall, in which event the cut-out is operated whereby the belts cease to rotate.

8. A device as claimed in claim 7 including movie-projector means together with a viewing screen positioned adjacent said platform means for viewing by a user on said platform means.

9. A device as claimed in claim 8 wherein said projector means is controlled by said cut-out means, whereby actuation of the cut-out by the user prevents continuing operation of the movie-projector means until release of tension on said harness leash means.

10. A device as claimed in claim 1 wherein said ski restraint means comprises a pivot post extending upwardly from said platform means, a pair of U-shaped tubular frames extending transversely from said pivot post, said frames having a pair of limbs, one limb of each said frame being secured to said pivot post, a tube attached to each of the skis extending substantially parallel to the length thereof and entered in sliding relation with the other limb of each said frame, and centering spring means providing longitudinally centering forces on said skis relative to said frames.

References Cited

UNITED STATES PATENTS 3,159,400    12/1964    Brass.
3,164,247    1/1965    Hall _____ 272—56.5

FOREIGN PATENTS 1,086,010    8/1954    France.

RICHARD C. PINKHAM, *Primary Examiner.*